United States Patent [19]
Kuriacose et al.

[11] Patent Number: 5,111,292
[45] Date of Patent: May 5, 1992

[54] PRIORITY SELECTION APPARATUS AS FOR A VIDEO SIGNAL PROCESSOR

[75] Inventors: Joseph Kuriacose, Plainsboro, N.J.; Alfonse A. Acampora, Staten Island, N.Y.; Joel W. Zdepski, Lebanon, N.J.

[73] Assignee: General Electric Company, Princeton, N.J.

[21] Appl. No.: 661,995

[22] Filed: Feb. 27, 1991

[51] Int. Cl.$^5$ .................. H04N 7/12; H04N 7/00; H04N 7/04; H04N 5/2

[52] U.S. Cl. .................. 358/133; 358/141; 358/142; 375/25; 375/27; 370/110.1

[58] Field of Search ............... 358/133, 135, 136, 138, 358/141, 142, 143, 144, 12, 11; 375/122, 25, 27; 364/725; 371/2; 341/143; 370/118, 109, 110.1, 99

[56] References Cited

U.S. PATENT DOCUMENTS

| | | | |
|---|---|---|---|
| 4,394,774 | 7/1983 | Widergren et al. | 382/56 |
| 4,544,950 | 10/1985 | Tu | 358/143 |
| 4,594,708 | 6/1986 | Servel et al. | 370/99 |
| 4,754,474 | 5/1988 | Schiff | 358/133 |
| 4,785,349 | 11/1988 | Keith et al. | 358/136 |
| 4,809,067 | 2/1989 | Kikuchi et al. | 358/135 |
| 4,827,339 | 5/1989 | Wada et al. | 358/136 |
| 4,858,005 | 8/1989 | Lodge | 358/135 |
| 4,873,577 | 10/1989 | Chamzas | 358/133 |
| 4,903,125 | 2/1990 | Parker | 358/140 |
| 4,914,675 | 4/1990 | Fedele | 375/25 |
| 4,961,204 | 10/1990 | Tanaka et al. | 375/25 |
| 5,060,229 | 10/1991 | Tyrell et al. | 370/110.1 |

OTHER PUBLICATIONS

A. Artieri et al., "A Chip Set Core for Image Compression", SGS-Thomson Microelectronics, Image Processing Unit, 17, avenue des Martyrs-B.P. 217, 38019 Grenoble Cedex, France.

International Organization for Standardization, ISO-IEC JTC1/SC2/WG11, "Coding of Moving Pictures and Associated Audio", MPEG Video Committee Draft, MPEG 90/176 Rev. 2, 12/18/90.

Digicipher HDTV System, General Instrument Corporation, Videocipher Division, 6262 Lusk Blvd. San Diego, California, 6/8/90.

J. Zdepski et al., "Prioritized Packet Transport of VBR CCITT H.261 Format Compressed Video on a CSMA/CD LAN", presented at the Third Annual Workshop on Packet Video, Morristown, N.J. 3/22/90.

Primary Examiner—James J. Groody
Assistant Examiner—Michael H. Lee
Attorney, Agent, or Firm—Joseph S. Tripoli; Eric P. Herrmann; Ronald H. Kurdyla

[57] ABSTRACT

Apparatus for encoding/decoding a HDTV signal for e.g. terrestrial transmission includes a priority selection processor for parsing compressed video codewords between high and low priority channels for transmission. A compression circuit responsive to high definition video source signals provides hierarchically layered codewords CW representing compressed video data and associated codewords T. defining the types of data represented by the codewords CW. The priority selection processor, responsive to the codewords CW and T, counts the number of bits in predetermined blocks of data and determines the number of bits in each block to be allocated to the respective channels. Thereafter the processor parses the codewords CW into high and low priority codeword sequences wherein the high and low priority codeword sequences correspond to compressed video data of relatively greater and lesser importance to image reproduction respectively.

13 Claims, 8 Drawing Sheets

FIG. 7 ated lower valued indexes and codeword types of lesser importance allocated higher indexes. From the total number of bits in the block, the calculating means calculates the number of bits B to be applied to the high priority data stream in accordance with a predetermined percentage. Thereafter the calculating means determines the codeword number CW#j associated with the codeword CW, which when its bits are summed with the bits of codewords associated with lower codeword numbers, produces a sum of bits equal to or just less than the number B. The calculating means then causes all codewords CW associated with codeword numbers CW#i which are lesser and greater than CW#j to by applied to the high and low priority data streams respectively.

PRIORITY SELECTION APPARATUS AS FOR A VIDEO SIGNAL PROCESSOR

This invention relates to a system for providing and processing a high definition television (HDTV) signal, and more particularly to apparatus for dividing compressed video data between two data streams.

BACKGROUND OF THE INVENTION

Digital high definition video data may be successfully transmitted over terrestrial television channels, as described herein, by partitioning the video data between high and low priority information, and quadrature amplitude modulating the high and low priority data on separate carriers respectively. The modulated carriers are included in a 6 MHZ frequency spectrum and then the combined signal is translated to occupy a standard broadcast channel spectrum. The high priority data is transmitted with relatively high power and the low priority data with relatively low power. High priority data is that video data which is sufficient to reproduce an image, albeit of lesser quality than a high definition image.

The present invention is directed to circuitry for separating compressed video data between relatively high and low priority video data. For purposes of this disclosure the video data will be presumed to be compressed in MPEG like format. What is meant by "MPEG like" is a coding format similar to the standardized coding format being established by the International Organization for Standardization. The standard is described in the document "International Organization for Standardization", ISO-IEC JT(1/SC2/WG1), Coding of Moving Pictures and Associated Audio, MPEG 90/176 Rev. 2, Dec. 18, 1990, which document is incorporated herein by reference for description of the general code format.

The MPEG standard transmits 240 lines (NTSC) per frame non-interlaced, which is typically accomplished by encoding only the odd or even fields of an interlaced source video signal. For transmitting HDTV signals the standard is modified to provide, for example 480 lines per field, and both the odd and even fields are transmitted. In addition the number of pixels per line is increased to for example 1440. Conceptually these changes only affect the data rate and do not affect the compression philosophy.

SUMMARY OF THE INVENTION

The present invention is apparatus for parsing compressed video codeword data into two data streams including high and low priority video data respectively. The apparatus is responsive to codewords CW representing compressed video data, and codewords TYPE associated with respective codewords CW provided by video compression circuitry. The codewords TYPE indicate the type of data represented by respective codewords. The codewords CW are of variable bit length and define hierarchically layered compressed data including for example information headers, motion vectors and transformed video coefficients.

Codewords CW of predetermined blocks of data are applied to a buffer memory and the total number of bits of the codewords CW are counted. As the codewords are applied to the buffer memory a calculating circuit examines the associated codewords type and allocates codeword numbers CW#i to respective codewords CW. The value assigned to the index i is related to the type of the respective codeword, with codewords types of greater importance to image reproduction alloc

DETAILED DESCRIPTION

An exemplary HDTV system which may be supported by the present invention includes a two-to-one interlaced signal of 1050 lines at 59.94 frames per second. The nominal active picture has 960 lines of 1440 pixels each with an aspect ratio of 16×9. The signal is transmitted using two 64 quadrature amplitude modulated (64-QAM) carriers, frequency multiplexed in a 6 MHz transmission band. The nominal total bit rate, including video, audio and auxiliary data, is 26–29 Mbps.

The video signal is initially compressed in conformance with an MPEG-like format. Thereafter the MPEG-type signal codewords are parsed into two bit streams in accordance with the relative importance of the respective codeword types. The two bit streams are independently processed to apply error correction overhead bits, and then caused to QAM respective carriers. The modulated carriers are combined for transmission. The bit streams of relatively greater and lesser importance are designated high priority (HP) and low priority (LP) channels respectively. The high priority channel is transmitted with approximately twice the power as the lower priority channel. The high priority/low priority information ratio is approximately one-to-four. The approximate net data rates after forward error correction are 4.5 Mbps HP and 18 Mbps LP.

Figure 1:
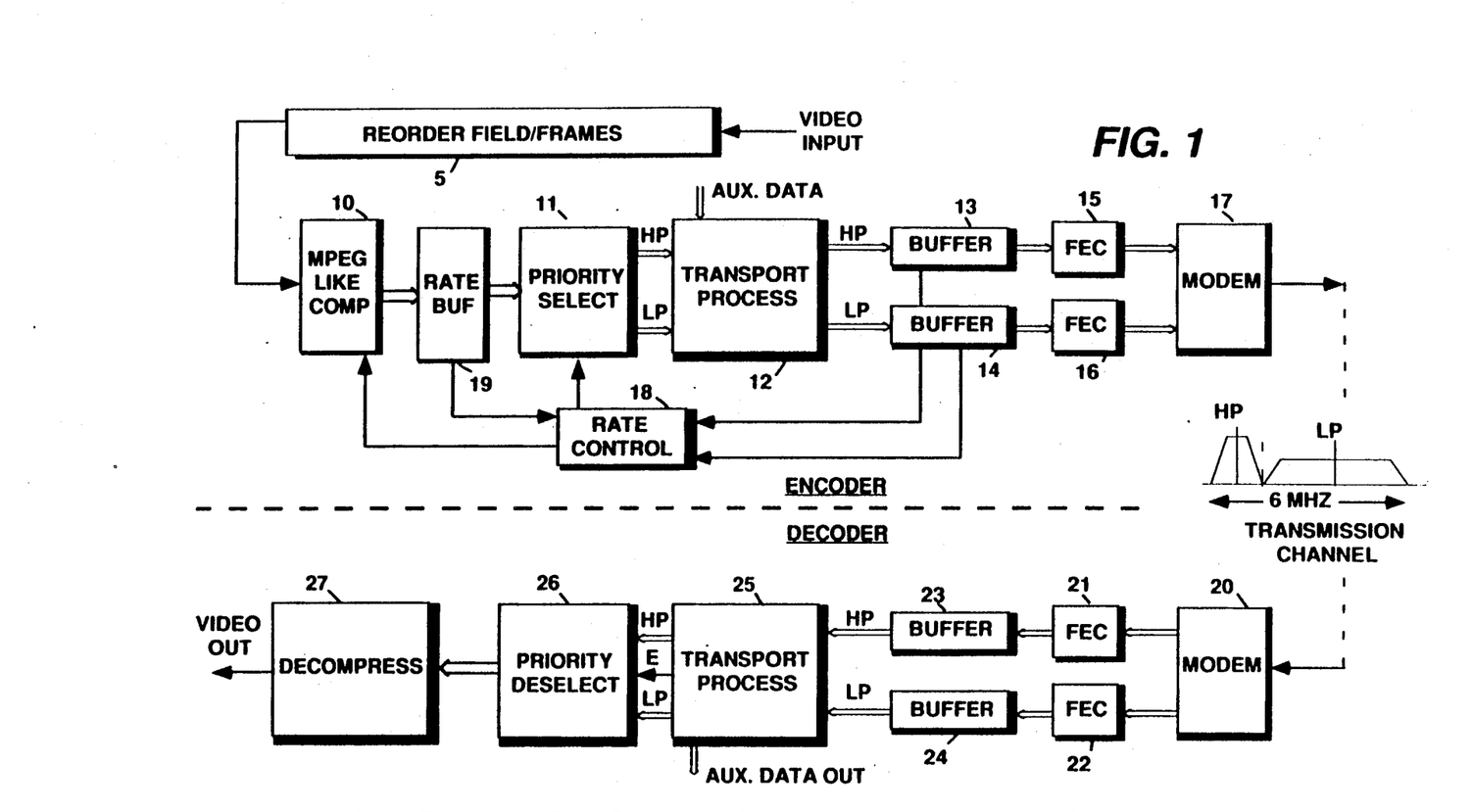
FIG. 1 is a block diagram of an HDTV encoding/decoding system embodying the invention.

FIG. 1 illustrates an exemplary HDTV encoding/decoding system according to the invention. FIG. 1 shows the system processing a single video input signal, but it is to be understood that the luminance and chrominance components are compressed separately, and that the luminance motion vectors are utilized for generating compressed chrominance components. The compressed luminance and chrominance components are interleaved to form macroblocks before codeword priority parsing.

Figure 1B:
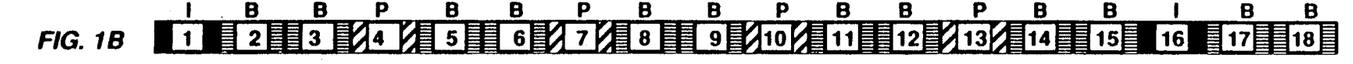
FIGS. 1B–1C are pictorial representations of sequences of fields/frames of encoded video signal useful in describing the invention.
Figure 1C:
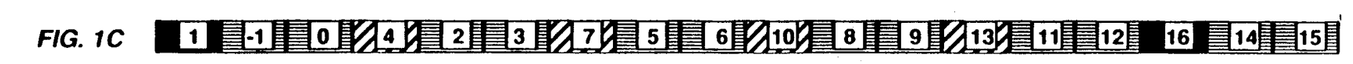

A sequence of image fields/frames as per FIG. 1B is applied to circuitry 5 which reorders the fields/frames according to FIG. 1C. The reordered sequence is applied to a compressor 10 which generates a compressed sequence of frames that are coded according to an MPEG-like format. This format is hierarchical and is illustrated in abbreviated form in FIG. 3A.

Figure 2:
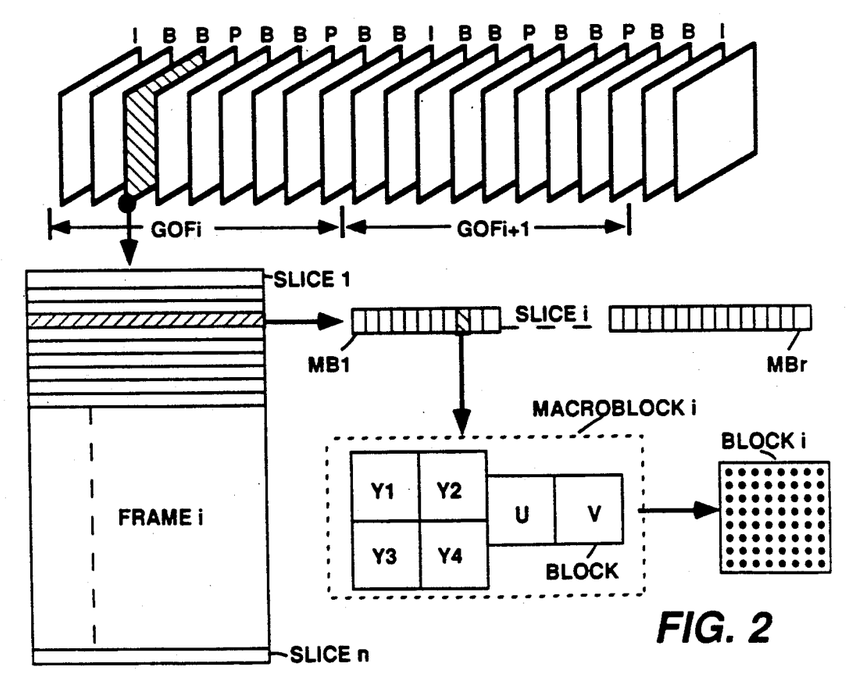
FIG. 2 is a pictorial representation of the data layers provided by the compression circuit of FIG. 3.

When referring to the MPEG-like signal produced by the present system what is meant is that a) successive fields/frames of video signal are encoded according to an I, P, B coding sequence, and b) coded data is hierarchically layered at least with picture, slice and macroblock levels. I frames are intraframe compressed, P frames are forward predicted frames, and B frames are bidirectionally predicted frames. The respective coding layers are illustrated pictorially in FIG. 2.

Figure 3:
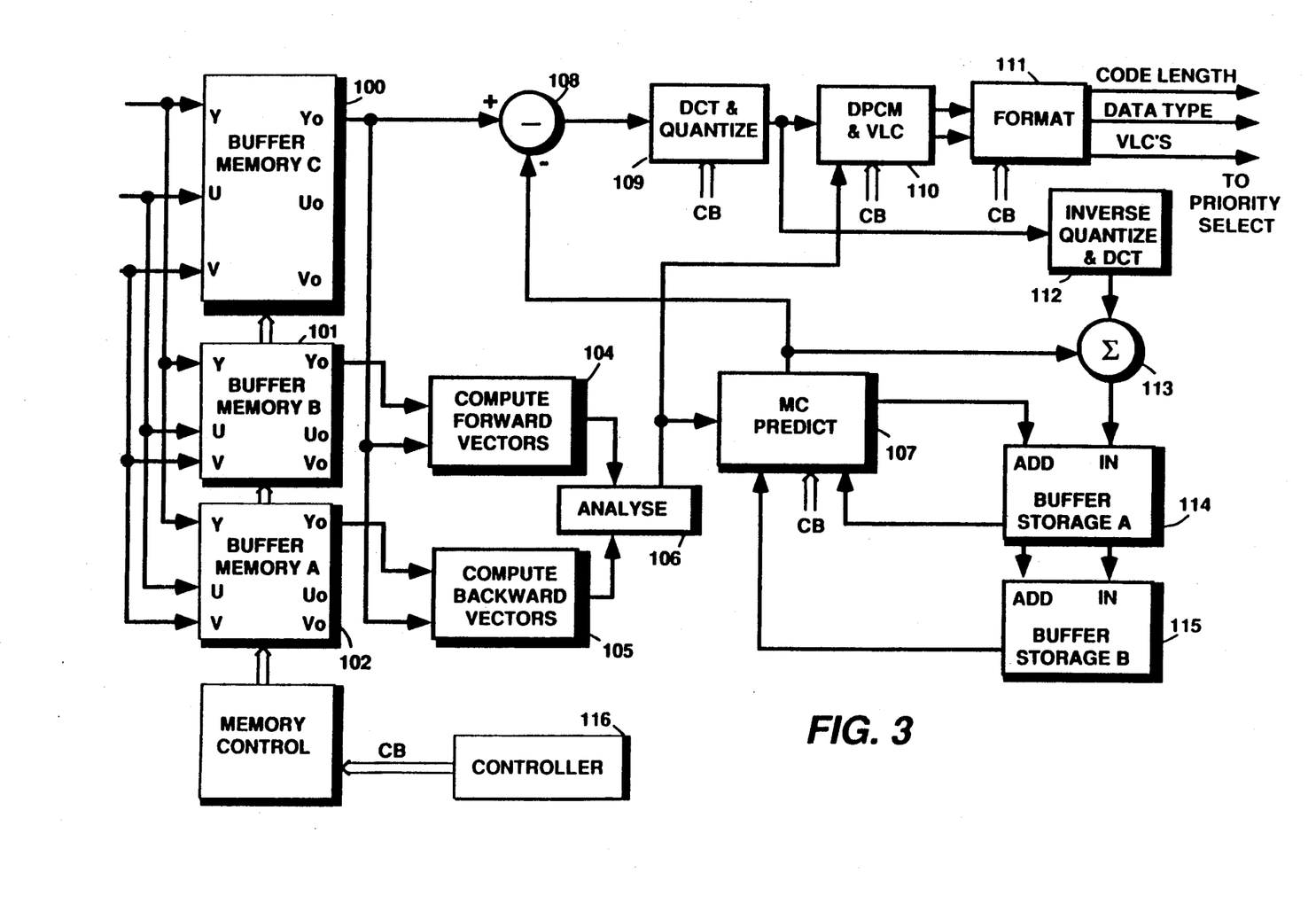
FIG. 3 is a block diagram of a video signal compression circuit.
Figure 3A:
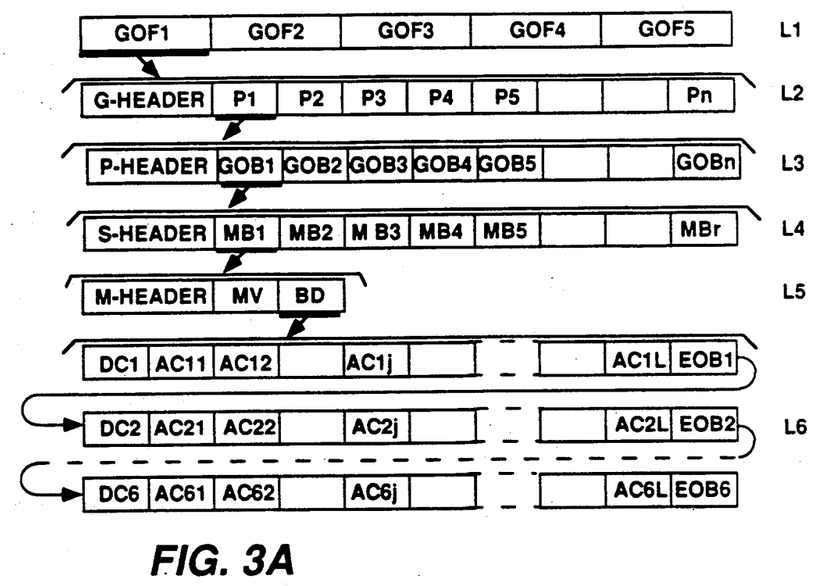
FIG. 3A is a generalized pictorial representation of the data format provided by the compression circuit of FIG. 3.

The coded output signal of the present system is segmented in groups of fields/frames (GOF) illustrated by the row of boxes L2 (FIG. 3A). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block. See FIG. 2. A block represents a matrix of pixels, e.g., $8 \times 8$ over which a discreet cosine transform (DCT) is performed. The four luminance blocks are a $2 \times 2$ matrix of contiguous luminance blocks representing, e.g., a $16 \times 16$ pixel matrix. The chrominance (U and V) blocks represent the same total area as the four luminance blocks. That is the chrominance signal is subsampled by a factor of two horizontally and vertically relative to luminance, before compression. A slice of data corresponds to data representing a rectangular portion of an image corresponding to an area represented by a contiguous group of macroblocks.

The block coefficients are provided one block at a time with the DCT, DC coefficient occurring first followed by respective DCT AC coefficients in the order of their relative importance. An end of block code EOB is appended at the end of each successively occurring block of data.

The amount of data provided by the compressor 10 is determined by the rate control element 18. As is well known compressed video data occurs at variable rates, and desirably, data is transmitted at a constant rate equivalent to the channel capacity, to realize efficient use of the channel. Rate buffers 13 and 14 perform the variable to constant data rate translation. It is also known to adjust the amount of data provided by the compressor in accordance with the level of occupancy of the buffers. Thus the buffers 13 and 14 include circuitry to indicate their respective level of occupancy. These indications are applied to the rate controller 18 to adjust the average data rate provided by the compressor 10. The adjustment is typically accomplished by adjusting the quantization applied to the DCT coefficients. Quantization levels may be different for the different types of frame compression. Details of an exemplary method for determining quantization levels may be found in application Ser. No. 494,098, filed 15 Mar. 1990 and entitled "Digital Signal Coding With Quantization Level Computations," which application is included herein by reference.

Compressed video data hierarchically formatted as indicated in FIG. 3A is coupled to a priority select element 11, which parses the coded data between a high priority channel HP and a low priority channel LP. High priority information is that information, the loss or corruption of which, would create the greatest degradation in reproduced images. Stated conversely, it is the least data needed to create an image, albeit less than a perfect image. Low priority information is the remaining information. The high priority information includes substantially all of the header information included in the different hierarchical levels plus the DC coefficients of the respective blocks and a portion of the AC coefficients of the respective blocks (level 6, FIG. 3A).

The ratio of HP and LP data at the transmitter is approximately 1:4. At the transport processor auxiliary data is added to the signal to be transmitted. This auxiliary signal may include digital audio signal and, e.g., teletext data. In a preferred embodiment at least the digital audio will be included in the HP channel.

The HP and LP compressed video data are coupled to a transport processor 12 which a) segments the HP and LP data streams into transport blocks, b) performs a parity check on each transport block and appends parity check bits thereto, and c) multiplexes the auxiliary data with the HP or LP video data. The parity check bits are utilized by the receiver to provide error concealment. Each transport block includes a header including information indicative of the type of information included in the block, e.g., video audio and pointers to the starting points of contiguous like data.

The HP and LP data streams from the transport processor 12 are applied to the respective rate buffers 13 and 14, which convert the variable rate compressed video data from the processor 12 to data occurring at a substantially constant rate. The rate adjusted HP and LP data are coupled to forward error encoding elements 15 and 16 which a) interleave blocks of data to preclude large error bursts from corrupting a large contiguous area of a reproduced image; b) perform REED SOLOMON forward error correction encoding independently to the respective data streams; and c) appends e.g. Barker codes to the data for synchronizing the data stream at the receiver. Thereafter the signals are coupled to a transmission modem wherein the HP channel data quadrature amplitude modulates a first carrier and the LP channel data quadrature amplitude modulates a second carrier displaced from the first carrier by approximately 2.88 MHz. The 6 dB bandwidth of the modulated first and second carriers are respectively about 0.96 MHz and 3.84 MHz. The modulated first carrier is transmitted with approximately 9 dB greater power than the modulated second carrier. Since the HP information is transmitted with greater power it is much less prone to corruption by the transmission channel. The HP carrier is located in the portion of the frequency spectrum of an, e.g., NTSC TV, transmission channel normally occupied by the vestigial sideband of a standard NTSC TV signal. This portion of the signal channel is normally significantly attenuated by the Nyquist filters of standard receivers and thus HDTV signals with this transmission format will not introduce cochannel interference.

At the receiver the transmitted signal is detected by the modem 20 which provides two signals corresponding to the HP and LP channels. These two signals are applied to respective REED SOLOMON error correcting decoders 21 and 22. The error corrected signals are coupled to rate buffers 23 and 24 which receive data at a variable rate commensurate with the requirements of the subsequent decompression circuitry. The variable rate HP and LP data is applied to a transport processor 25 which performs the inverse process of the processor 12. In addition it performs a degree of error detection responsive to the parity check bits included in the respective transport blocks. The transport processor 25 provides separated auxiliary data, HP data, LP data and an error signal E. The latter three signals are coupled to a priority deselect processor 26 which reformats the HP and LP data into an hierarchically layered signal which is applied to a decompressor 27. The decompressor 27 performs the inverse function of the compressor 27.

FIG. 3 illustrates an exemplary compressor apparatus which may be utilized for element 10 of FIG. 1, for providing hierarchically layered compressed video data. The apparatus shown only includes the circuitry required to generate compressed luminance data. Similar apparatus is required to generate compressed chrominance U and V data. In FIG. 3 there are elements 104 and 105 designated as elements for computing forward and backward motion vectors respectively. Since whether a motion vector is forward or backward depends only upon whether the current field is analyzed with respect to a prior or succeeding field, both elements are realized with similar circuitry, and in fact both elements 104 and 105 alternate on a field/frame basis between generating forward and backward vectors. The elements 104 and 105 may be realized using integrated circuits of the type designated STI 3220 MOTION ESTIMATION PROCESSOR available from SGS-THOMSON MICROELECTRONICS. In order to achieve the necessary processing rates each of the elements 104 and 105 comprise a plurality of such integrated circuits operating simultaneously on different areas of respective images.

Element 109 designated DCT & Quantize performs the discreet cosine transform and quantization of transform coefficients and may be realized using integrated circuits of the type designated STV 3200 DISCREET COSINE TRANSFORM available from SGS-THOMSON MICROELECTRONICS. Element 109 will also be realized with a plurality of such devices operated in parallel to concurrently process different areas of the image.

Referred to FIG. 1C and assume that frame 16 is currently available. Previously occurring P frame 13 has been snatched and stored in the buffer memory B 101. In addition a generated predicted frame 13 has been stored in one of the buffer storage elements 114 or 115. As frame 16 occurs it is stored in buffer memory A, 102. In addition frame 16 is applied to a working buffer memory 100. As frame 16 occurs, appropriate image blocks of data are coupled from the memory 100 to the minuend input of a substracter 108. During I frame compression the subtrahend input of the subtracter 108 is held at a zero value so that data passes through the subtracter 108 unaltered. This data is applied to the DCT and quantizer element 109 which provides quantized transform coefficients to elements 110 and 112. Element 112 performs inverse quantization and inverse DCT transformation of the coefficients to generate a reconstructed image. The reconstructed image is applied via an adder 113 to, and stored in, one of the buffer storage elements 114 and 115 for use in compressing subsequent B and P frames. During compression of I frames no information is added (by adder 113) to the reconstructed image data provided by element 112.

Element 110 performs two functions during I frame compression. First it performs differential (DPCM) coding of the DC coefficients generated by element 109. It then variable length encodes (VLC) the differentially coded DC coefficients and zero run and variable length encodes the AC coefficients generated by element 109. The VLC codewords are applied to a formatter 111 which segments the data and appends header information thereto in conformance with the layers illustrated in FIG. 3A. Coded data from element 111 is then passed to the priority select apparatus. Each of the elements 109, 110 and 111 are controlled by a system controller 116 to cyclically perform the appropriate operations at the appropriate times.

After frame 16 a "B" frame (14) occurs and is loaded into buffer memory 100. Data from frame 14 is coupled to both of elements 104 and 105. Element 104, responsive to from data frame 14 accessed from memory 100 and data from frame 13 accessed from memory 101, calculates forward motion vectors for respective blocks of 16×16 pixels of image data. It also provides a distortion signal which is indicative of the relative accuracy of the respective forward motion vectors. The forward motion vectors and the corresponding distortion signals are coupled to an analyzer 106.

Element 105, responsive to data from frame 14 contained in memory 100 and I frame 16 data from memory 102, generates backward motion vectors and corresponding distortion signals which are also coupled to the analyzer 106. Analyzer 106 compares the distortion signals against a threshold, and if both exceed the threshold, provides both the forward and backward motion vectors as the motion vector, and also provides a corresponding signal related to the ratio of the distortion signals. Upon reconstruction predicted images are generated using both forward and backward vectors and corresponding frame data from which derived. An interpolated frame is generated from the forward and backward predicted frames in accordance with the ratio of distortion signals. If the distortion signals for both the forward and backward motion vectors are less than the threshold, the motion vector with the corresponding lesser valued distortion signal is selected as the block motion vector.

After the motion vector has been determined, it is applied to the motion compensated predictor 107 which accesses the appropriate data block defined by the vector from the previously regenerated frame 16 or frame 13 or both, stored in the storage elements 114 and 115. This data block is applied to the subtrahend input of the subtracter 108 wherein it is subtracted on a pixel by pixel basis from the corresponding block of pixel data from the current frame 14 provided by the buffer memory 100. The differences or residues are then encoded in element 109 and the coefficients applied to element 110. The corresponding block vector is also applied to element 110. For encoded B and P frames, the DC coefficients are not differentially encoded, but both the DC and AC coefficients are variable length encoded. The motion vectors are differentially encoded and then the differentially encoded vectors are variable length encoded. The coded vectors and coefficients are then transferred to the formatter 111. The encoded B frames are not inverse quantized and inverse transformed in element 112 since they are not used for subsequent encoding.

P frames are similarly encoded except that only forward motion vectors are generated. For example P frame 19 is encoded with motion vectors associating corresponding blocks of I frame 16 and P frame 19. During encoding of P frames, element 112 provides corresponding decoded residues and element 107 provides the corresponding predicted P frame. The predicted frame and the residues are added in adder 113 on a pixel-by-pixel basis to generate the reconstructed frame which is stored in the one of storage elements 114 and 116 not containing the frame information from which the predicted P frame is generated. The reconstructed and stored P frame is used for encoding subsequent B frames. For both P and B field/frames it should be noted that DCT's are performed on a block basis (e.g. a matrix of 8×8 pixels), but motion vectors are calculated for macroblocks (e.g., a 2×2 matrix of luminance of blocks or a 16×16 matrix of pixels).

Figure 4:
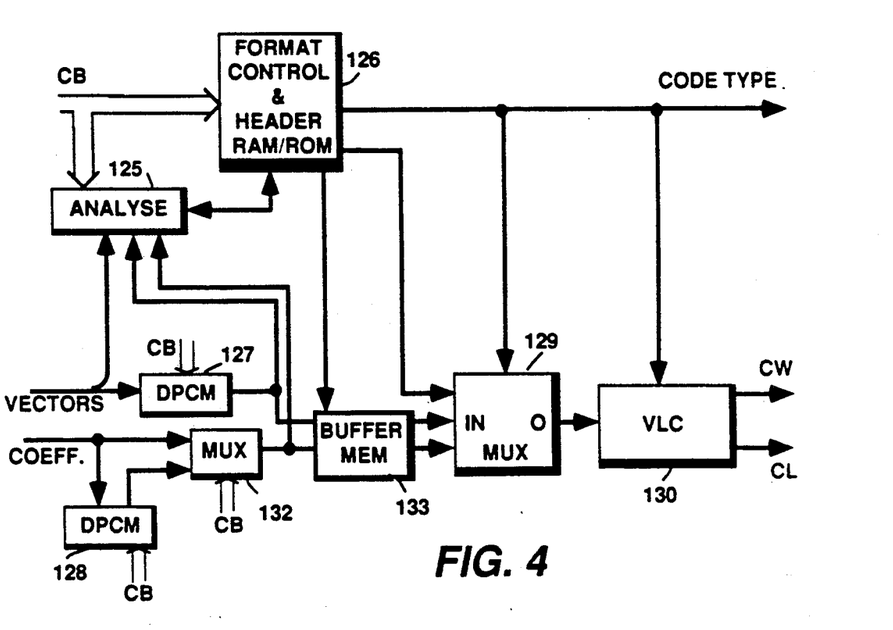
FIG. 4 is a block diagram of exemplary circuitry which may be utilized for the formatting circuit 111 of FIG. 3.

FIG. 4 shows exemplary circuitry in block form which may be used to implement the functions of elements 110 and 111 of FIG. 3. The output format of this circuitry is parallel-bit variable length words. This format is selected to facilitate the implementation of both the priority select processor and the transport processor. In addition two extra signals are provided which define the code type of each output codeword, CW, and the length, CL, of each codeword.

In FIG. 4 motion vectors from the analyzer 106 (FIG. 3) are differentially encoded in the DPCM element 127 on a slice basis and coupled to a multiplexer 129 via a buffer memory 133. Transform coefficients from the transform element 109 are coupled to a multiplexer 132 and a differential encoding element DPCM 128. Differentially encoded coefficients from the DPCM 128 are coupled to a second input of the multiplexer 132. During encoding of P or B frames all of the coefficients are passed directly through the multiplexer 132. During encoding of I frames, the DC coefficients are selectively differentially encoded by the DCPM 128. The differentially encoded DC coefficients and the non-differentially encoded AC coefficients are multiplexed by the multiplexer 132 and coupled to a second input of the multiplexer 129 via the buffer memory 133. Header information from a format control and header element 126 are coupled to a third input of the multiplexer 129. Element 126 includes stored information and control circuitry to a) provide the requisite header information for the different code layers (FIG. 3A) and to b) provide control signals to time division multiplex the header information, motion vectors and the transform coefficients via multiplexer 129. Element 126 is responsive to the system control circuitry via the control bus CB to provide the appropriate headers corresponding to picture size, rate, picture coding type quantizer parameters, etc. Certain of the header information is calculated by element 126 in conjunction with an analyzer 125. In the MPEG-type format much of the header information (e.g., level 5 of FIG. 3A) is variable such as the type of block encoding, the type of motion vectors, whether a block has zero valued motion vectors and or whether all coefficients in a block are zero values. The vector information and coefficient information is applied to the analyzer 125 to determine these types of header information. Whether a motion vector is a forward, backward and or zero valued is directly determinable by examination of the vectors. Whether all coefficients in a block are zero value is determinable by simply accumulating the values of the coefficients included in a block. Once the type of variable header data is determined, it is assigned a codeword and provided to the multiplexer 129 at the appropriate time. The element 126 also provides information relating to the codeword type currently being multiplexed, i.e., header information, motion vector information, DC coefficients, AC coefficients.

The time division multiplexed information is coupled to a variable length encoder 130 which is also controlled by element 126. In the figure the VLC control is shown provided by the codeword type signal. The different code types are variable length coded according to different VLC code tables and thus it is appropriate to utilize the code type signal for such control.

The VLC 130 may include a zero-run encoder for encoding zero runs of the AC coefficients and a plurality of Huffman code tables addressed by the respective codewords passed by the multiplexer 129 for variable length encoding the transform coefficients and the motion vectors. The particular table utilized is enabled by the code type signal. Each of the code tables may include corresponding tables programmed with the code lengths of the respective variable length codewords. The codewords CW and the code lengths CL are provided concurrently on separate busses in parallel-bit format. In general the header information is not variable length coded and is passed unaltered by the VLC 130. However, the VLC 130 includes code length tables responsive to the code type signal to provide the code lengths of the header codewords. Alternatively, a bit counter may be included in the VLC to count the number of bits of these data.

The element 126 also controls the writing and reading of data provided to and from the buffer memory 133.

Figure 5:
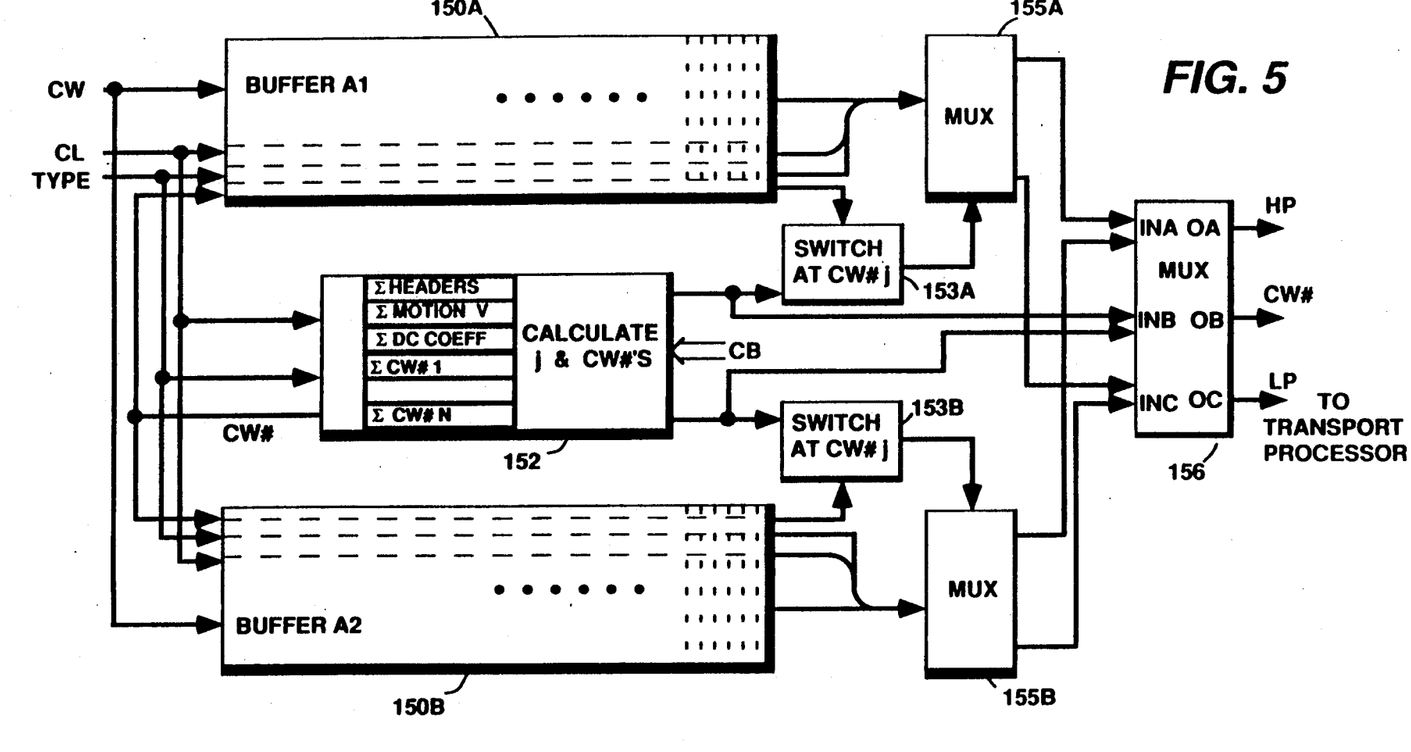
FIG. 5 is a block diagram of exemplary circuitry which may be implemented for the Priority Select circuitry of FIG. 1.

FIG. 5 illustrate exemplary apparatus for performing the priority selection process. This apparatus may operate in several modes. For example, data may be prioritized on an equal basis for the different field/frame types, or on an unequal basis for the different field/frame types. In the latter instance assume that the HP channel passes 20 percent of the total data transmitted and that three percent of the HP channel is consumed by auxiliary data. If the video data is quantized for maximum transmission channel efficiency, 17.53% of the video data may be allocated to the HP channel. In the former instance the high priority data for the I, P and B frames may be allocated in the ratio of $\alpha:\beta:1$ respectively. The values $\alpha$ and $\beta$ may be user selectable and/or determined adaptively from the amount of coded data occurring in prior frames or groups of frames.

Referring to FIG. 5, data from the variable length encoder 130 is coupled to respective input ports of two buffer memories 150A and 150B and to a data analyzer 152. The respective buffers include enough memory to store for example a slice of data. The buffers 150A and 150B are operated in "ping-pong" fashion to alternately write slices of data and read slices of data. Thus while buffer 150A writes data from, e.g., slice n, buffer 150B reads data from slice n−1.

As data is written to a particular buffer, the analyzer 152 generates a codeword number CW#i for each codeword and stores the CW#i in association with the corresponding codeword. The analyzer also calculates the point, or codeword, at which the data should be split between HP and LP channels. The calculation is determined for the amount of data stored in the buffer. There are four general types of data including Header Data, Motion Vectors, DC coefficients and AC coefficients. The DC and AC coefficients over a block occur in the order of DC coefficient first followed by codewords representing the AC coefficients in generally descending order of importance. The total number of bits are counted for all the codewords in the buffer. Then the codeword at which the sum of bits is equal to the HP percentage is identified by a codeword number, CW#j. This number is applied to a switching element 153A (153B), and used to control the multiplexer 155A (155B). After the codeword number CW#j is identified, the codewords, codelength data, codeword type data and codeword numbers are read in parallel from the buffer 150A (150B). The codewords, codelengths and codetypes are applied to the input of a multiplexer 155A (155B), and the codeword numbers are applied to an input of the switching element 153A (153B). As the data is read from the buffer, the switching element 153A (153B) compares the codeword numbers to the calculated number CW#j. For all codeword numbers less than or equal to CW#j, the switching element provides a control signal which conditions the multiplexer 155A (155B) to pass the corresponding data to the HP channel via a further multiplexer 156. For codeword numbers greater than CW#j, the multiplexer 155A (155B) is conditioned to pass the corresponding data to the LP channel via multiplexer 156. The multiplexer 156 is conditioned to pass HP and LP data provided by the buffer 150A, (150B) which is currently being read.

The analyzer 152 is responsive to the codelength signals, and the code type signals. Responsive to the code type signals, the analyzer generates codeword numbers for each occurring codeword. For example, each codeword representing header information is assigned the number (−2). Each codeword representing motion vectors and DC coefficients are assigned the numbers (−1) and (0) respectively. Successive AC codewords are assigned ascending integers i from 1 to n on a block-by-block basic.

The analyzer 152 also includes an accumulator which, responsive to the codelength and type signals, independently sums the number of bits of the codewords of each code type entered in the buffer 150A (150B). These sums are added to provided the total number of codeword bits contained in the buffer. The total sum is multiplied by the decimal equivalent of the percent to be allotted to the HP channel to produce a check sum. Thereafter the respective code type sums are sequentially added in ascending order of codeword number CW#i to produce partial sums. Each partial sum is compared with the check sum until the partial sum exceeds the check sum. The codeword number CW#j associated with the immediately previous partial sum is the last codeword within a block to be assigned to the HP channel. All succeeding codewords, i.e., CW#j+1 to CW#n, for respective blocks are assigned to the LP channel.

Figure 5A:
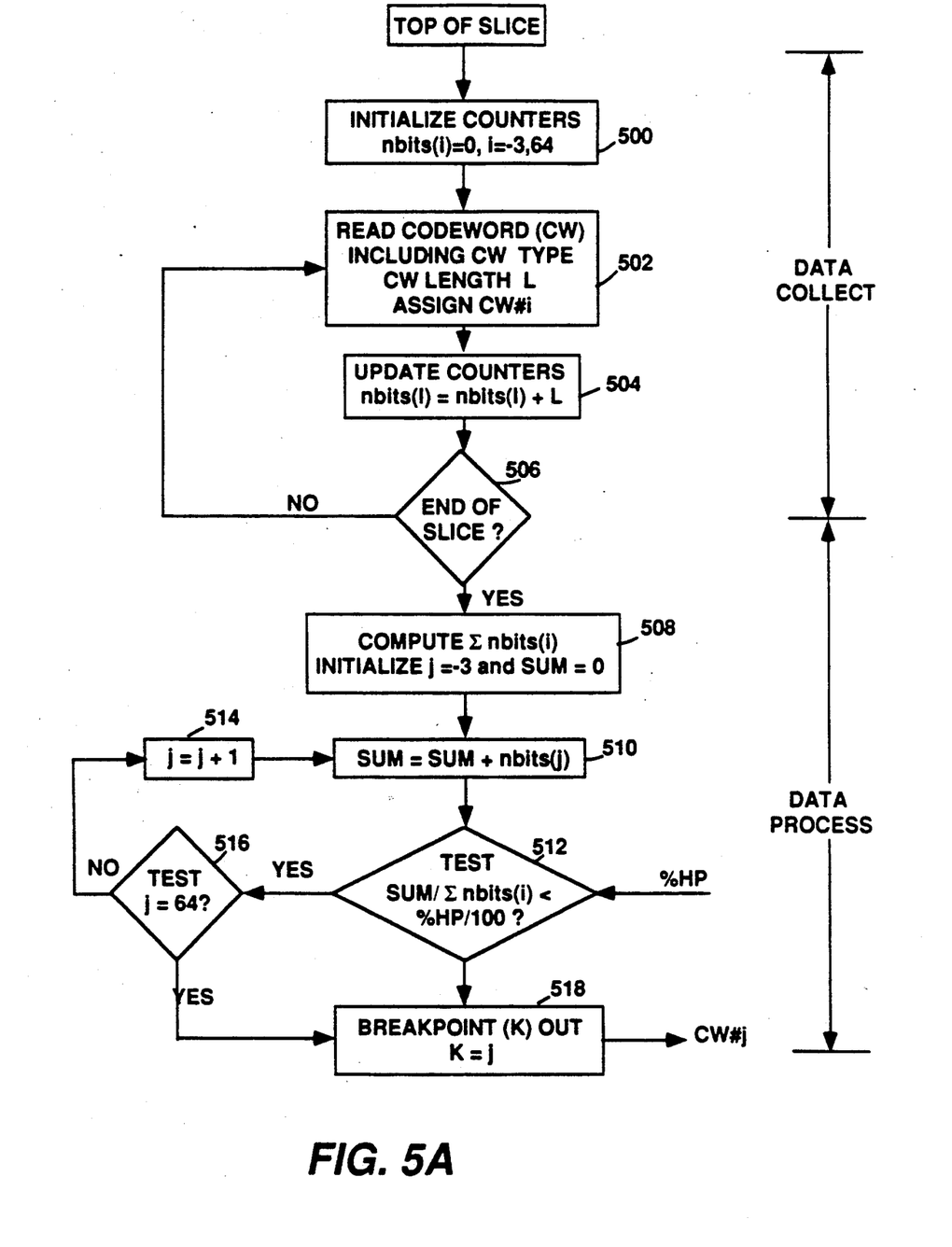
FIG. 5A is a flow chart of the operation of the analyzer of FIG. 5.

FIG. 5A is a flow chart of the operation of the analyzer 152. At the beginning of each slice of data the analyzer resets 500 the count values of the respective types of codewords. Then as data is written into the respective buffer, the analyzer reads 502 the codeword type, the corresponding codeword length L, and assigns a codeword number CW#i depending upon the codeword type. The analyzer adds 504 the codeword length L to the sum of all previous codewords that have been assigned the same codeword number CW#i. It then checks 506 to determine if all data for a slice has been evaluated. This may be accomplished by examining the codeword types for the next occurring slice header. If the end of the slice has not occurred it continues 502. If it has occurred the analyzer proceeds 508 to determine the HP/LP data breakpoint. This process is initiated by setting a partial sum value to zero, and then to begin accumulating 510 the sums of bits of the respective types of codewords corresponding to the assigned CW#i's. That is the sum of bits of CW#−3 is added to the sum of bits of CW#−2 to produce a first partial sum. Then the sum of bits of CW#−1 is added to the first partial sum to produce a further partial sum and so on. Each time a partial sum is produced a comparison 512 is made. In this example the comparison is of the ratio of the current partial sum to the total number of bits in the slice against the decimal equivalent of the percentage of data to be allocated to the HP channel (% HP/100). If the ratio is less, the sum of bits of the codewords corresponding to the next higher CW#i is added 514, 510 to the previous partial sum. If the ratio is greater the index i=j of the last CW#i, is output 518, i.e. the CW#j is output. Note, in the MPEG like signal, there are a maximum of 64 DC and AC coefficient values. For each ratio that is less than (% HP/100) a check 516 is made to determine whether CW#64 has occurred in order to halt the calculations to preclude the system from entering an endless loop.

Figure 6:
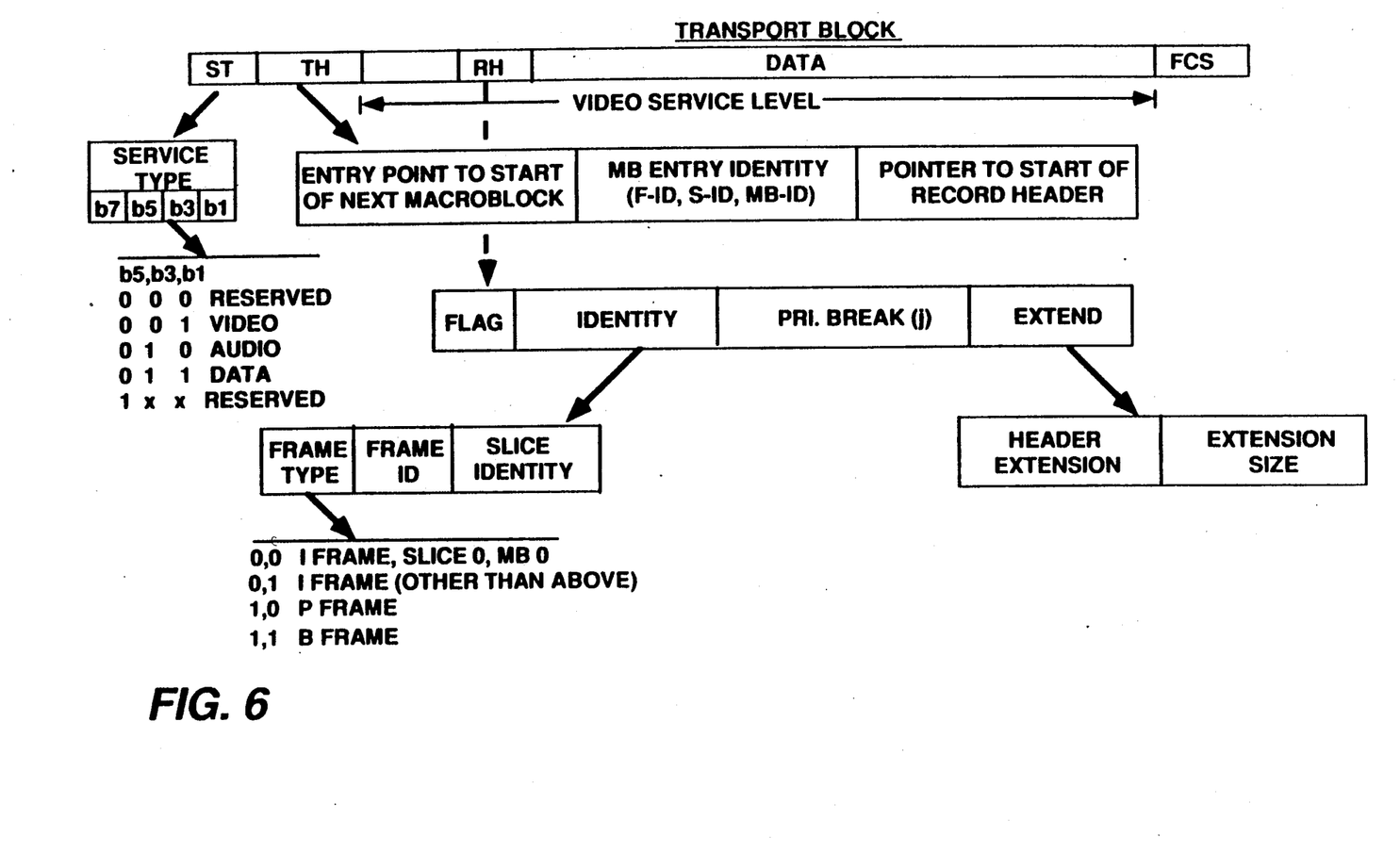
FIG. 6 is a diagram of the signal format provided by the transport processor 12 of FIG. 1.

Respective HP and LP data from the priority selector is arranged in transport blocks designed to enhance error concealment at the receiver. The transport block format is illustrated in FIG. 6. An exemplary HP transport block includes 1728 bits and an LP transport block includes 864 bits. Respective transport blocks may include more or less than a slice of data. Thus a particular transport block may include data from the end of one slice and data from the beginning of the next subsequent slice. Transport blocks including video data may be interleaved with transport blocks containing other data, e.g., audio. Each transport block includes a service type header ST which indicates the type of information included in the respective transport block. In this example the ST header is an 8-bit word which indicates whether the data is HP or LP, and whether the information is audio, video or auxiliary data. Four bits of the 8-bit word are used to represent the ST information and four bits are used to provide Hamming parity protection of the ST information bits.

Each transport block includes a transport header TH immediately following the ST header. For the LP channel the transport header includes a 7-bit macroblock pointer, an 18-bit identifier and a 7-bit record header (RH) pointer. The transport header of the HP channel includes only an 8-bit record header (RH) pointer. The macroblock pointer is used for segmented macroblock or record header components, and points to the start of the next decodable component. For example, if the particular transport block includes macroblock data associated with the end of slice n and the beginning of slice n+1, the data from slice n is placed adjacent the transport header and the pointer indicates that the next decodable data is adjacent the transport header TH. Conversely, if a record header RH is adjacent the TH, the first pointer indicates the byte position following the record header RH. A zero valued macroblock pointer indicates that the transport block has no macroblock entry point.

The transport block may include none, one or more than one record header, and their positions are variable within the transport block. A record header occurs at the beginning of each slice of macroblock data in the HP channel, and at the beginning of each macroblock in the LP channel. No record headers are included in transport blocks that include only video data header information. The record header (RH) pointer points to the byte position containing the start of the first record header in the transport block. Note, if a record header follows macroblock data, it is place at a byte boundary. That is the last variable length code preceding the record header may be bit-stuffed to insure that the start of the record header occurs at a bit position which is an integral number of bytes from the beginning of the transport block. The record headers are placed at byte boundaries to enable the decoder to locate them since they are embedded in a stream of concatenated variable length codewords. A zero valued RH pointer indicates that there are no record headers in the transport block. If both the record header pointer and the macroblock pointer are zero valued, this state indicates that the transport block includes only video data header information.

The 18-bit identifier in the LP transport header identifies the current frame type, the frame number (modulo 32), the current slice number, and the first macroblock contained in the transport block.

Following the transport header is either a record header, RH, or data. As indicated in FIG. 6 the record header for the video data in the HP channel includes the following information: A 1-bit FLAG which indicates if a header extension, EXTEND, is present. Following the FLAG is an identifier IDENTITY, which indicates a) the field/frame type I, B or Pf b) a field/frame number (modulo 32) FRAME ID; and c) a slice number (modulo 64) SLICE IDENTITY. Following the identifier the record header includes a macroblock priority break point indicator, PRI BREAK (j). The PRI BREAK (j) indicates the codeword number CW#j, developed by the analyzer 152 of the priority selector, for dividing the codewords between the HP and LP channels. Lastly, an optional header extension may be included in the HP record header.

The record header incorporated in the LP channel includes only an identifier, IDENTITY, similar to the identifier implemented in the HP channel.

Each transport block is terminated with a 16-bit frame check sequence, FCS, which is calculated over all bits in the transport block. The FCS may be generated using a cyclic redundancy code.

Figure 7:
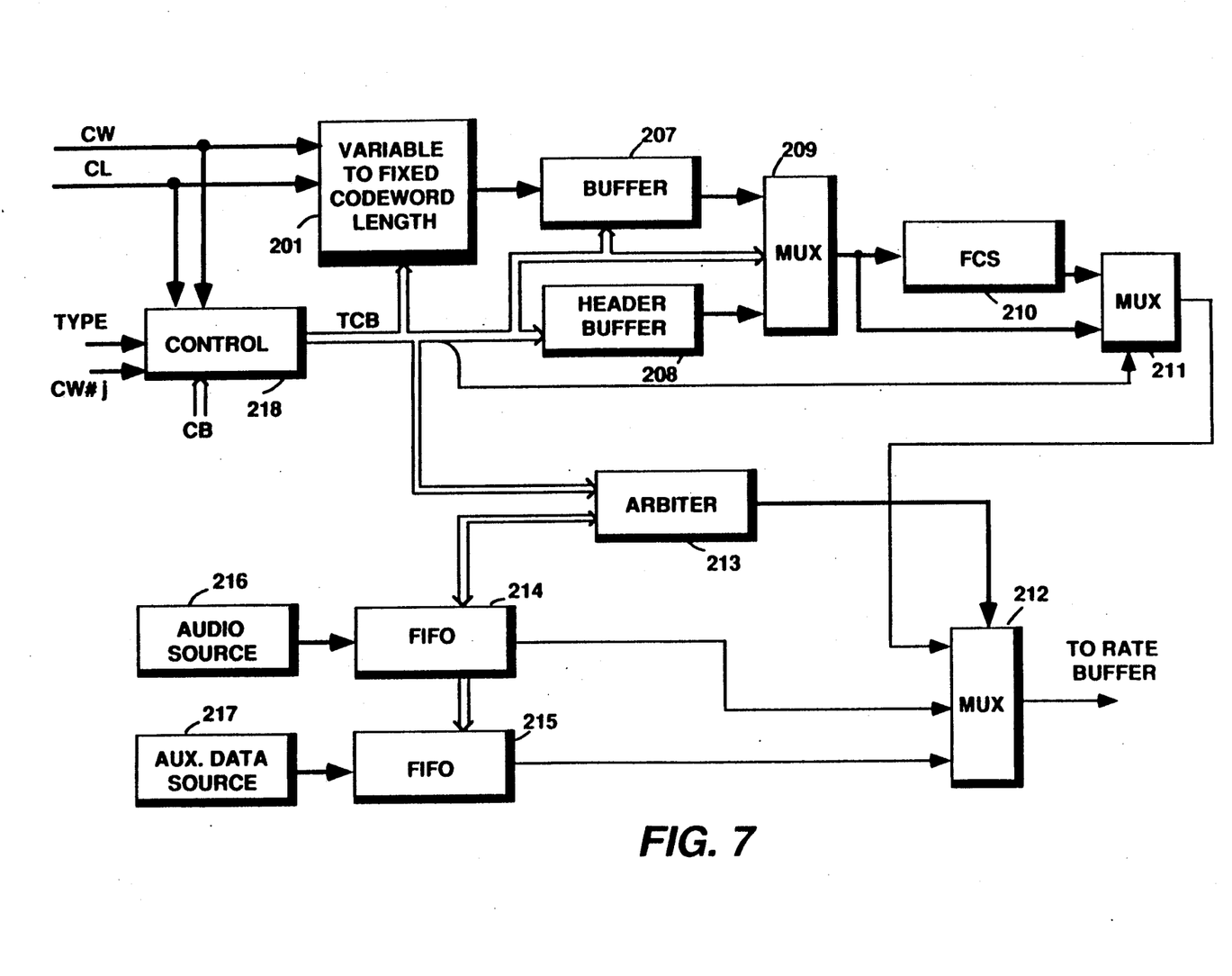
FIG. 7 is a block diagram of exemplary circuitry which may be implemented for the Transport Process circuit of FIG. 1.

FIG. 7 illustrates exemplary apparatus of the transport processor. In the figure an arbiter 213 interleaves, via a multiplexor 212, transport blocks of video data from a multiplexer 211, audio data from a memory 214 and auxiliary data from a memory 215. The audio data is provided in transport block form by the source 216 and applied to a first-in first-out memory 214. The auxiliary data is provided in transport block form by the source 217 to a first-in first-out memory 215. The formats of the audio and auxiliary data transport blocks may differ from the format of the video transport blocks, however all transport blocks will include a leading service type header, and preferably will be of equal length. The arbiter 213 responds to the level of occupancy of buffers 214, 215 and 207 in such fashion to insure that none of these buffers overflow.

The apparatus of FIG. 7 operates on one of the HP or LP signals and similar apparatus is required for the alternate signal. However, if all of the audio and auxiliary signal is HP data an arbiter for interleaving transport blocks will not be included in the LP transport block processor and vice versa.

In FIG. 7, codeword, CW, codelength, CL, and code type, TYPE, data from the priority selector are coupled to a transport controller 218, and the codewords and code type signal are coupled to a variable word length to fixed word length convertor 201. The convertor 201 packetizes the variable length codewords into, for example, 8-bit bytes in order to reduce the amount of storage space required of the rate buffers 13 and 14. The convertor 201 may be of the type described in U.S. Pat. No. 4,914,675. The fixed length words provided by the convertor 201 are temporarily stored in the buffer 207.

The transport controller 218 responds to the CW, CL, TYPE and CW#j data to construct the transport block headers (ST, TH, RH) and applies these headers to a header buffer 208, which may be internal to the controller 218. Responsive to the code lengths, code types and codewords, the controller 218 generates the requisite timing signals for interleaving (via the multiplexer 209) the fixed length video data words and transport block header information into transport blocks of predetermined numbers of bits.

The transport blocks provided by the multiplexer 209 are coupled to one input of the multiplexor 211 and to the input terminal of a frame check sequence coder FCS 210, the output of which is coupled to a second input of the multiplexer 211. The FCS 210, responsive to transport block data forms two-byte error check codes for respective transport blocks. The multiplexer 211 is conditioned to pass respective transport blocks provided by the multiplexer 209, and then to append the 16-bit or two-byte FSC code from element 210 to the end of the transport block.

In the foregoing description of the transport processor it is assumed that all of the header information provided by the compressor 10 is included in the video data stream provided by the transport processor. It should be recognized that much of the video data header information is also included in the transport headers and as such provides redundant information. In an alternative arrangement, the controller 218 may preclude the converter 201 from accepting video header data which would be redundantly included in the transport block headers, thus enhancing the overall coding efficiency. At the receiver the excised video header data may be reconstructed from the transport block header information and reinserted in the video data stream.

Figure 8:
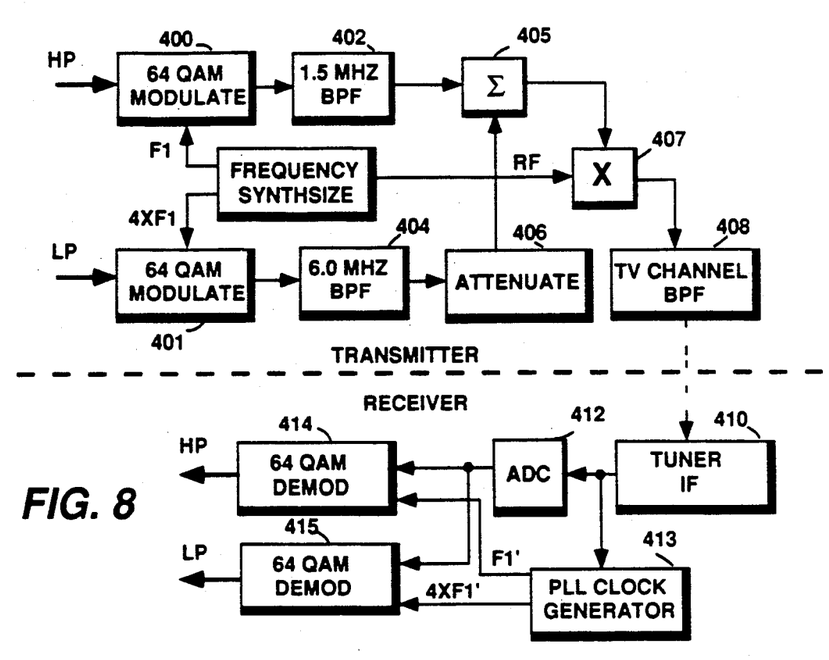
FIG. 8 is a block diagram of exemplary circuitry which may be implemented for the MODEMS 17 and 20 of FIG. 1.

FIG. 8 illustrates exemplary modem circuitry for both the transmitting and receiving ends of the system. HP and LP data form the forward error correction circuits 15 and 16 are applied to respective 64 QAM modulators 400 and 401. The modulator 400 provides an HP analog signal with a −6 dB bandwidth of approximately 0.96 MHZ. This signal is applied to a 1.5 MHZ band pass filter 402 to eliminate high frequency harmonics, and then is applied to an analog signal summer 405. The modulator 401 provides an LP analog signal with a −6 dB bandwidth of approximately 3.84 MHZ. This signal is applied to a 6 MHZ band pass filter 404 to eliminate high frequency harmonics, and then is applied to an attenuator 406. The attenuator 406 reduces the amplitude of the LP analog signal by approximately 9 dB relative to the HP analog signal. The attenuated LP signal is then coupled to the analog signal summer 405, wherein it is summed with the analog HP signal to produce a signal with a frequency spectrum similar to the signal spectrum shown in FIG. 1. The combined signal is applied to a mixer 407 wherein it is multiplied by an RF carrier to frequency translate the combined signal to a frequency band that comports with a standard TV transmission channel. The translated signal is then applied to a band pass filter 408, which tailors the spectral characteristics of the frequency translated signal to fit within the standard channel.

At the receiver, the transmitted signal is detected by a tuner/IF circuit 410 of conventional design, and applied to a PLL circuit 413 and an analog-to-digital converter (ADC) 412. The digitized signal is coupled to respective 64 QAM Demodulators 414 and 415. The demodulators 414 and 415 include band pass filters at their respective input connections to band limit the spectrum of the signals to be processed thereby to conform to the nominal signal spectrum of the HP and LP signals. The demodulators 414 and 415 are of conventional QAM demodulator design and are responsive to clock signals provided by the PLL circuit 413. The PLL 413 develops the requisite clock signals via phase locking a signal developed by a voltage controlled oscillator to one of the two carriers attendant the QAM signals.

The present invention has been described as operating upon MPEG like signals but it should be appreciated that it is applicable to operation on other types of coded signals. For example pyramid processed signals provide signal layers of different relative importance to image reproduction and thus are amenable to prioritization, and therefor priority selection by the present invention.

What is claimed is:

1. In a video signal encoder, apparatus for separating digital codewords CW of compressed video signal data into two data streams of codewords CW, respective codewords CW representing different types of compressed video data and having varying codelengths of different numbers of bits, said apparatus comprising:

video signal compression means for providing codewords CW of compressed video data and codewords TYPE, associated with respective codewords CW, and indicating the respective type of the associated codeword CW;

a source of a parameter P representing the percent of data to be allocated between said two data streams;

memory means, coupled to said compression means, for storing at least predetermined amounts of codewords CW;

calculating means, responsive to said codewords TYPE and CW, and said parameter P for a) calculating the total number of bits of said predetermined amount of codewords CW; b) for generating numbers CW#i corresponding to said types of compressed video data and associating said codewords CW#i with corresponding codewords CW, where i represents an index of integral numbers, and wherein codewords CW of types having relatively greater importance for image reproduction are assigned indexes i of lower value and codewords CW of types having relatively lesser importance for image reproduction are assigned indexes i of higher value; c) for determining, from said parameter P and said total number of bits, the number of bits B to be allocated to one of said two data streams; d) for determining the largest codeword number CW#j associated with a codeword CW which when its bits are summed with bits of all codewords associated with codeword numbers having lesser valued indexes produces a sum which does not exceed said number B; and e) for forming a first data stream of codewords CW from said memory means for which associated codeword numbers CW#i are less than or equal to CW#j, and a second data stream of codewords CW for which associated codeword numbers CW#i are greater than CW#j.

2. The apparatus set forth in claim 1 wherein said memory means includes a first memory space for writing a current predetermined amount of codewords CW and a second memory space for reading a previously written predetermined amount of codewords CW.

3. The apparatus set forth in claim 1 wherein said codeword numbers CW#i are written to said memory means at memory locations associated with corresponding codewords CW.

4. The apparatus set forth in claim 3 wherein said calculating means includes;

means for concurrently reading respective codewords CW and associated codeword numbers CW#i from said memory means;

multiplexing means, having an input port coupled to receive said codewords CW from said memory means, and first and second output ports for providing said first and second data streams of codewords;

comparing means, responsive to said number CW#j and said codeword numbers CW#i read from said memory means, for conditioning said multiplexing means to pass codewords CW to said first and second output ports when said codeword numbers CW#i are lesser and greater than CW#j respectively.

5. The apparatus set forth in claim 1 wherein said video signal compression means further provides codewords CL associated with respective codewords CW, said codewords CL corresponding to the number or bits included in associated codewords CW and said calculating means includes means for summing said codewords CL to provide said total number of bits of said predetermined amount of codewords CW.

6. The apparatus set forth in claim 1 further including means for including codeword numbers CW#j for respective predetermined amounts of codewords with said first data stream of codewords.

7. In a video signal encoder, apparatus for separating digital codewords CW of compressed video signal data into two data streams of codewords CW, respective codewords CW representing different types of compressed video data and which codewords are subject to being variable length encoded with codelengths of different numbers of bits, said apparatus comprising:
   video signal compression means for providing said codewords CW;
   a source of a parameter P representing the percent of data to be allocated between said two data streams;
   memory means, coupled to said compression means, for storing a predetermined group of codewords CW, which group is associated with a predetermined image area;
   means, responsive to said parameter P for generating an indicia which indicates particular codewords CWi in said group of codewords;
   means for reading said group of codewords from said memory means in sequences of codewords, said sequences arranged according to a predetermined hierarchy of codeword types, and responsive to said indicia, for applying codewords CW according to said hierarchy through the codeword CWi to a first data stream, and applying the remaining codewords CW to a second data stream.

8. The encoder set forth in claim 7 wherein said video signal compression means also provides further codewords L associated with each codeword CW, which codewords L indicate the number of bits with which respective associated codewords CW are subject to variable length encoding.

9. The encoder set forth in claim 8 wherein said means, responsive to said parameter P for generating an indicia, includes means responsive to said codewords L for generating respective sums of the codewords L according to said types of codewords CW.

10. The encoder set forth in claim 9 wherein said means, responsive to said parameter P for generating an indicia, further includes means for summing the respective sums of codewords L.

11. The encoder set forth in claim 10 wherein said means, responsive to said parameter P for generating an indicia, further includes means responsive to the sum of the respective sums of codewords L and the parameter P, for calculating the number of bits corresponding to the $P^{th}$ percent of the sum of the respective sums and thereafter successively summing the respective sums of codewords L, according to said hierarchy of codeword types, until a sum value occurs which is substantially equal to the $P^{th}$ percent of the sum of the respective sums, and identifying the codeword type at which said sum value is satisfied.

12. The encoder set forth in claim 11 further including means for tagging the codewords written into said memory means with codes indicative of the type of each codeword, and the means for applying codewords CW to the first and second data streams, applies codewords of greater hierarchy through said identified type, to said first data stream, and codewords of lesser hierarchy to said second data stream.

13. Apparatus for parsing compressed video data into high and low priority data streams, said video data occurring as codewords of different types, which types are categorized in a predetermined hierarchy of priority, said apparatus comprising;
   means for providing a parameter P indicative of the percentage of data to be applied to each of said high and low priority data streams;
   means for grouping codewords associated with respective predetermined image areas, and responsive to said parameter P, for determining the types of codewords in each group, which, when their respective bits are summed according to said type hierarchy in descending order of priority, will substantially equal the $P^{th}$ percent of the total number of codeword bits in said group; and
   means for applying said determined types of codewords to said high priority data stream, and the remaining types of codewords to the low priority data stream.

* * * * *

UNITED STATES PATENT AND TRADEMARK OFFICE
CERTIFICATE OF CORRECTION

PATENT NO. : 5,111,292
DATED : May 5, 1992
INVENTOR(S) : Kuriacose Joseph et al.

It is certified that error appears in the above-identified patent and that said Letters Patent is hereby corrected as shown below:

Title page, item [19], change "Kuriacose et al" to --Joseph et al--.

Title page, item [75], change "Joseph Kuriacose" to --Kuriacose Joseph--.

Signed and Sealed this

Twenty-second Day of June, 1993

Attest:

MICHAEL K. KIRK

Attesting Officer       Acting Commissioner of Patents and Trademarks